United States Patent [19]

Champagne

[11] Patent Number: 5,115,834
[45] Date of Patent: May 26, 1992

[54] VALVE-LOCKING DEVICE

[75] Inventor: Raymond P. Champagne, Oxford, Mass.

[73] Assignee: Neles-Jamesbury, Inc., Worcester, Mass.

[21] Appl. No.: 772,952

[22] Filed: Oct. 8, 1991

[51] Int. Cl.⁵ .................. F16K 35/02; F16K 35/06
[52] U.S. Cl. ...................... 137/385; 70/177;
    70/180; 70/212; 251/90; 251/95; 251/104;
    251/286; 251/288
[58] Field of Search ............... 137/315, 385; 70/175,
    70/176, 177, 180, 203, 212; 251/90, 92, 95, 102,
    104, 106, 286, 287, 288

[56]  References Cited
U.S. PATENT DOCUMENTS

| | | | |
|---|---|---|---|
| 1,159,880 | 11/1915 | Tobin | 137/385 |
| 3,648,970 | 3/1972 | Hartmann et al. | 251/104 |
| 3,679,170 | 7/1972 | Bernas et al. | 251/104 |
| 3,865,130 | 2/1975 | Mullis | 137/385 |
| 3,960,168 | 6/1976 | Plympton | 137/385 |
| 3,976,095 | 8/1976 | Koch et al. | 137/385 |
| 4,126,023 | 11/1978 | Smith et al. | 70/177 |
| 4,162,690 | 7/1979 | Anderson | 137/385 |
| 4,203,572 | 5/1980 | Coffman | 251/95 |
| 4,208,033 | 6/1980 | Kesterman | 251/90 |
| 4,498,320 | 2/1985 | Mullis | 70/177 |
| 4,534,379 | 8/1985 | Burge | 137/385 |
| 4,770,388 | 9/1988 | Carman | 251/95 |
| 4,909,275 | 3/1990 | Massey et al. | 137/385 |
| 5,014,528 | 5/1991 | Roberts | 70/177 |

Primary Examiner—George L. Walton
Attorney, Agent, or Firm—Oblon, Spivak, McClelland, Maier & Neustadt

[57]  ABSTRACT

A lever-operated rotary valve having a rotary body for permitting fluid flow therein includes a locking device for selectively locking and unlocking the operating handle such that the operating handle of the rotary valve can be locked in a plurality of predetermined positions. The operating handle of the rotary valve can be oriented in any one of a plurality of positions and locked in that position without requiring the removal of the locking device. The locking device is an L-shaped member which fits on the stem of the rotary valve and includes aligned holes for receiving a padlock so that the locking device and handle are locked together.

7 Claims, 4 Drawing Sheets

VALVE-LOCKING DEVICE

BACKGROUND OF THE INVENTION

1. Field of the Invention

The present invention relates to a rotary valve for controlling fluid flow and a valve-locking device for use in association with such a rotary valve.

2. Description of the Related Art

Conventionally, rotary valves are utilized in situations where efficient cut-off or flow diversions are required in hydraulic systems. Locking devices are utilized for preventing unauthorized or inadvertent operation of the rotary valve. In conventional fluid flow systems, the selected operating position of a rotary valve is essential to the proper operation and functioning of the system and thus, the improper operation or positioning of the valve may result in a malfunction of the system which may result in dangerous and costly circumstances. Accordingly, it is desirable that rotary valves be provided with a locking device to prevent inadvertent or accidental movement of the operating handle as well as intentional tampering with the handle.

Conventional locking devices are complex and difficult to manufacture and handle. Additionally, some conventional locking devices utilize a handle as part of the locking device.

Conventional locking devices have drawbacks in that the rotary valve cannot be operated without the removal of the locking device and the design of the locking device does not permit the handle to be mounted in a variety of rotational quadrants of the rotary valve. Additionally, conventional locking devices do not permit the rotary valve to be unlatched, rotary stroked and relatched smoothly with one hand.

SUMMARY OF THE INVENTION

Accordingly, an object of the present invention is to provide for a novel rotary valve and locking device for the rotary valve in which the valve can be operated without removal of the locking device.

A further object of the present invention is to provide for a rotary valve and a locking device in which the valve can be unlocked, rotary stroked and relocked smoothly with one hand.

A further object of the present invention is to provide for a device in which the locking device can be mounted in any rotary quadrant of the rotary valve.

A further object of the present invention is to provide for a locking device which remains part of the valve and accordingly there are no loose parts.

A further object of the present invention is to provide for a locking device in which the handle strength of the operational handle on the rotary valve is unaffected by the valve locking device.

The present invention provides for a rotary valve which comprises a valve body having a first bore therein for fluid flow. The valve body comprises a flange having a stop post; a stem extending into a second bore in the body; and control means for controlling fluid flow in the first bore of the valve body. The control means is operatively connected to the stem and is disposed in the first bore. A handle is mounted on the stem for operating the control means between opened and closed positions, the handle comprising an upwardly extending portion having a first hole therein. The rotary valve further comprises a valve locking member, the valve locking member defining a substantially L-shaped member. One leg of the L-shaped valve locking member defines a folded portion and comprises second and third holes which are aligned with each other. The other leg of the L-shaped valve locking member defines an opening.

The valve locking member of the present invention is positioned on the stem such that the stem extends through the opening of the other leg of the valve locking member. The handle is mounted on the stem above the valve locking member and the upwardly extending portion of the handle extends between the folded portion of the valve locking member.

The valve locking member of the present invention is slidable between a locked position in which the first hole on the handle is aligned with the second and third holes on the folded portion of the valve locking member for permitting a lock means to pass between the first, second and third holes and an abutting surface of a periphery of the other leg of the valve locking member abuts against the stop post such that the handle is locked in a predetermined position; and an unlocked position in which the first hole is not aligned with the second and third holes and the abutting surface of the other leg of the valve locking member is spaced from the stop post for permitting movement of the handle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
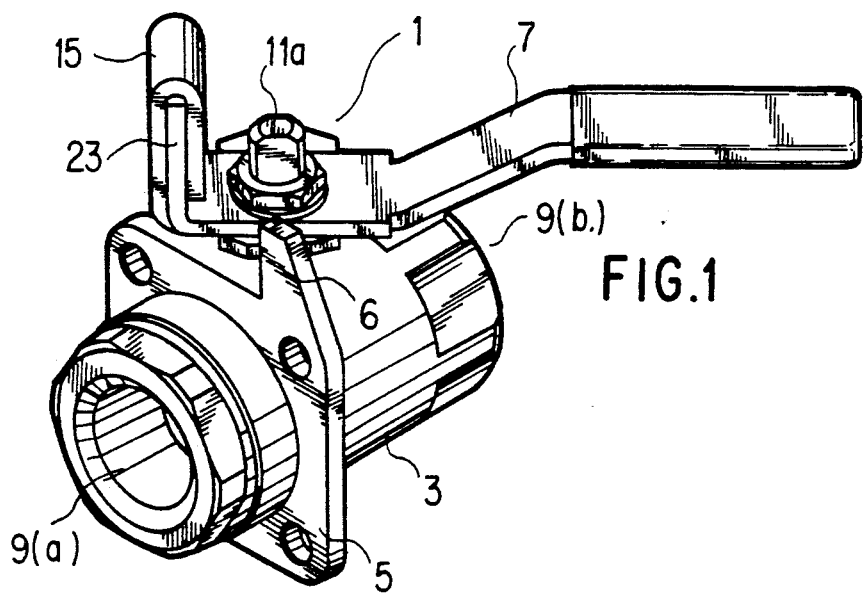
FIG. 1 is a perspective view of a rotary valve and a valve locking member mounted thereon of the present invention.

Referring to the drawings, wherein like reference numerals designate identical or corresponding parts throughout the several views, and more particularly to FIG. 1 thereof, FIG. 1 illustrates a rotary valve 1 having a rotary body 3 and a flange portion 5 at a front end thereof. The flange portion 5 has a projecting stop post 7 which cooperates with a locking member 15 to lock the handle in a predetermined position.

The interior of the rotary body 3 of the rotary valve 1 may contain any known control valve means 2 for controlling fluid flow passing through the openings 9(a) and 9(b) of the rotary valve. The control valve means 2 is operatively connected to a stem 11 (FIG. 3B) on which is mounted the locking member 15 and the handle 7. Both the locking member 15 and the handle 7 may be secured onto the stem through a stem nut 11a or other well known means.

The rotary valve of the present invention can be operated by rotating the handle between any of the four quadrants as illustrated in FIGS. 5A, 6A, 7A and 8A in order to control the control valve 2 within the rotary valve 1 so as to selectively open and close the fluid flow passage through the rotary valve. The flow control valve 2 located within the rotary valve body 3 can be any known flow control valve such as for example a ball-type control valve.

Figure 2A:
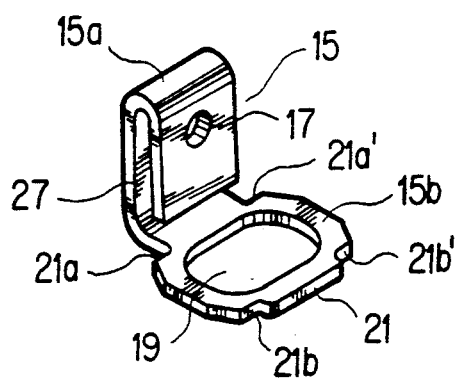
FIG. 2A is a perspective view of the valve locking member of the present invention.
Figure 2B:
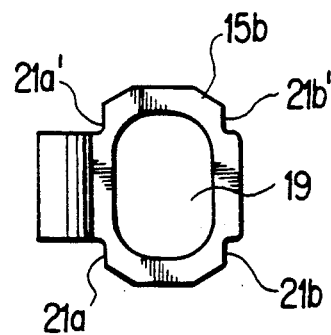
FIG. 2B is a top view of the valve locking member of FIG. 2A.
Figure 2C:
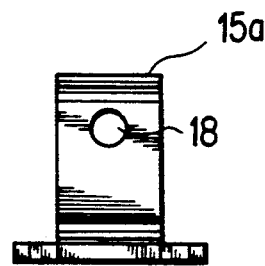
FIG. 2C is a front view of the valve locking member of FIG. 2A.
Figure 2D:
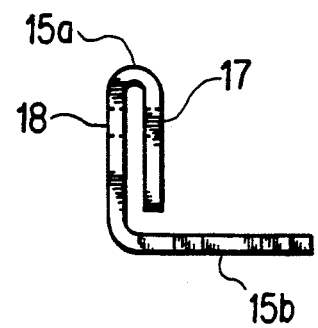
FIG. 2D is a side view of the valve locking member of FIG. 2A.

The locking member 15 of the present invention is illustrated in FIGS. 2A–2D and defines a substantially L-shaped member. As illustrated in FIG. 2A, the L-shaped member has a first leg 15a which defines a folded portion having aligned holes 17 and 18 (FIGS. 2A and 2D) and a second leg 15b defining an opening 19 and a peripheral surface 21 having abutting surfaces 21a, 21a', 21b and 21b'.

In use, the locking member 15 is positioned on the rotary valve 1 such that the stem 11 extends through the opening 19. The handle 7 which contains an aperture 25 on an upwardly extending portion 23 and a bore for cooperating with the stem 11 is positioned on stem 11 on top of the locking member 15. When the handle 7 is positioned on the stem and on top of the locking member 15 as shown in FIG. 1, the upwardly extending portion 23 of the handle having the aperture 25 extends between an area 27 created by the folded portion 15a of the locking member 15.

Figure 3A:
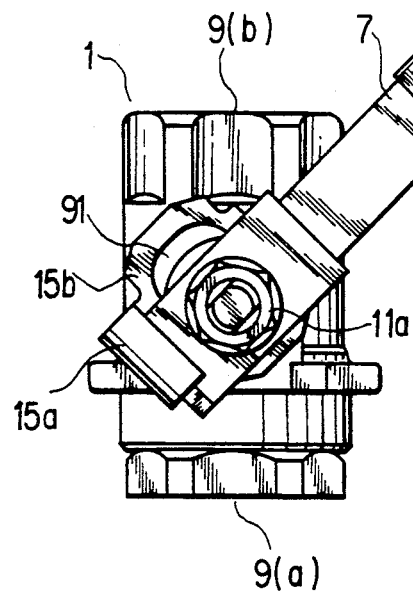
FIG. 3A is a top view of the rotary valve and valve locking member of FIG. 1 showing the valve locking member in an unlocked position.
Figure 3B:
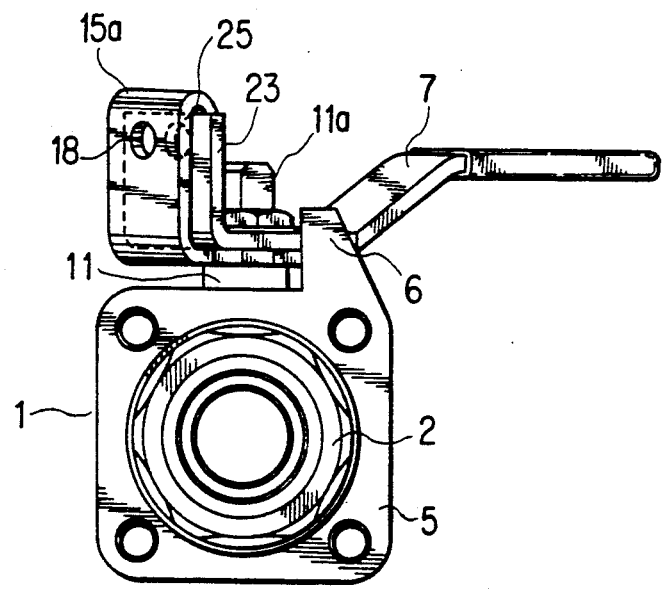
FIG. 3B is a front view of FIG. 3A.

In an unlocked position as shown in FIGS. 3A and 3B, due to the opening 19 of the locking member 15, the locking member 15 can be moved away from the stop post 6 in order to permit the combination of the handle 7 and the locking member 15 to clear the stop post 6 and permit the rotation of the handle 7 and the control valve member 2 located inside the rotary body 3 to a desired position in order to either cut off or permit the flow of fluid through the rotary valve 1.

Figure 4:
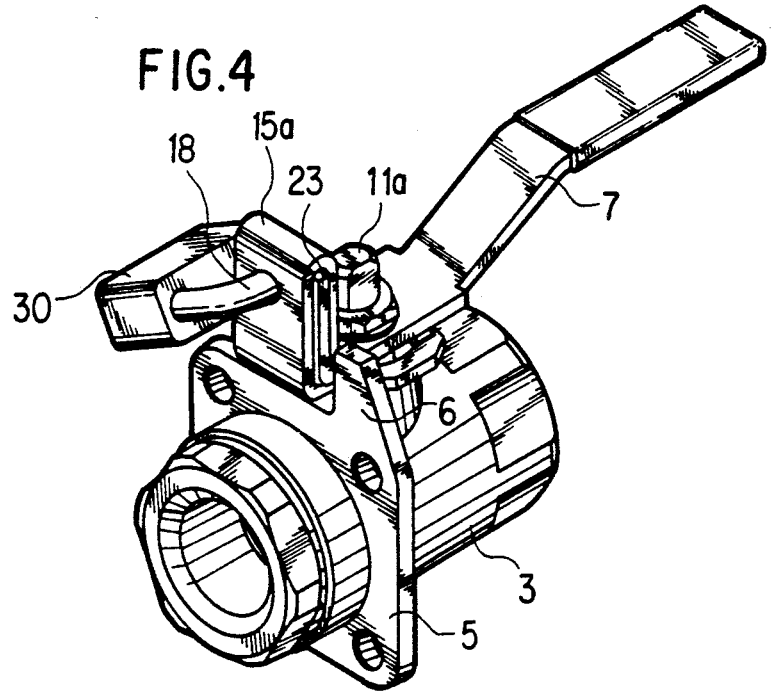
FIG. 4 is a perspective view of the rotary valve and valve locking member in a locked position with a padlock extending therebetween and representing a first quadrant of operation of the rotary handle.

In a locked position as illustrated in FIG. 4, the locking member 15 is moved toward the stop post 6 so that the hole 25 in the extending portion 23 of the handle 7 is aligned with the holes 17 and 18 in the leg 15a of the locking member 15 and one of the abutting surfaces such as 21a of the locking member 15 can abut against the stop post 6 as illustrated in FIGS. 4–5. In this position, a padlock 30 or similar locking means can be passed through the aligned holes 17, 25 and 18 so as to lock the rotary valve in a desired position.

Figure 5A:
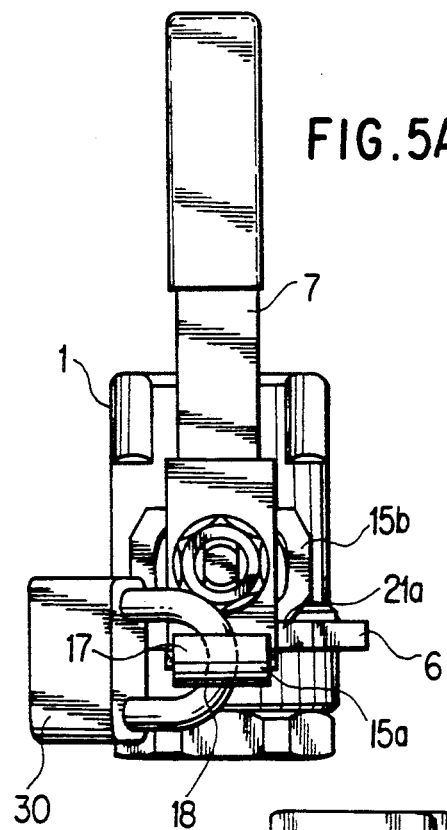
FIG. 5A is a top view of the rotary valve and valve locking member as shown in FIG. 4.
Figure 5B:
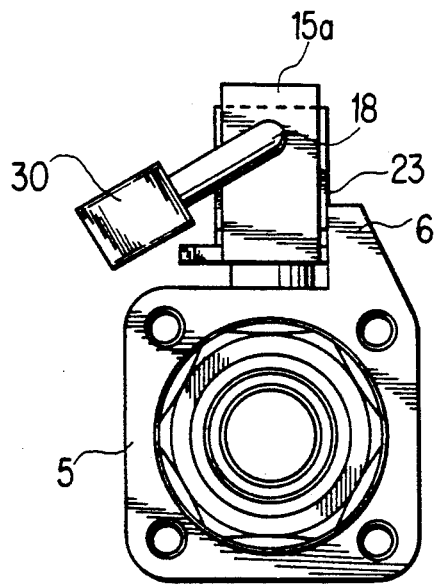
FIG. 5B is a front view of the rotary valve and valve locking member as shown in FIG. 5A.

For example, FIGS. 4 and 5 show the rotary valve locked in a first quadrant such that the control valve 2 may be locked in an open position. FIGS. 5A and 5B further illustrate the handle and locking member locked in the above-mentioned first quadrant.

Figure 6A:
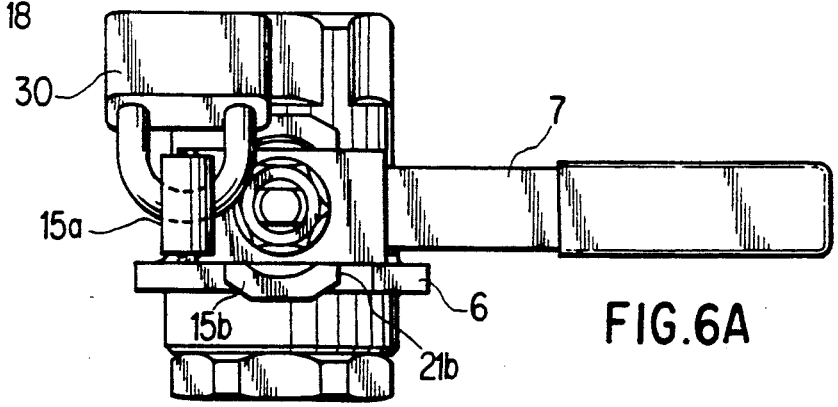
FIG. 6A is a top view of a locked rotary valve and valve locking member in a second quadrant of operation of the rotary handle.
Figure 6B:
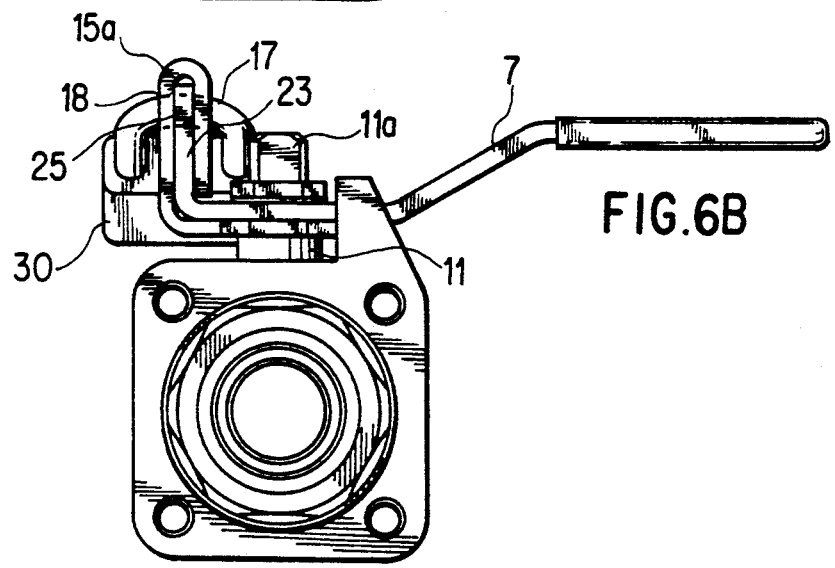
FIG. 6B is a front view of the rotary valve and valve locking member of FIG. 6A.

If it is desired to lock the handle 7 and locking member 15 in a second quadrant as shown in FIGS. 6A and 6B, the padlock is removed and the locking member 15 is moved as shown in FIGS. 3A and 3B so as to clear the stop 6. The handle 7 and locking member 15 can no be rotated into the second quadrant as shown in FIGS. 6A and 6B. Once the handle 7 is in the second quadrant, the hole 25 in the extending portion 23 of the handle 7 is aligned with the holes 17 and 18 o the folded portion of the locking member 15 so as to enable a locking means such as the padlock 30 to be inserted through the aligned holes. In the position shown in FIG. 6A, one of the abutting surface such as 21b of the locking member 15 can abut against the stop post 6 in order to prevent the movement of the handle 7 from the second quadrant illustrated in FIGS. 6A and 6B. This enables the rotary valve to be maintained in for example an opened position.

Figure 7A:
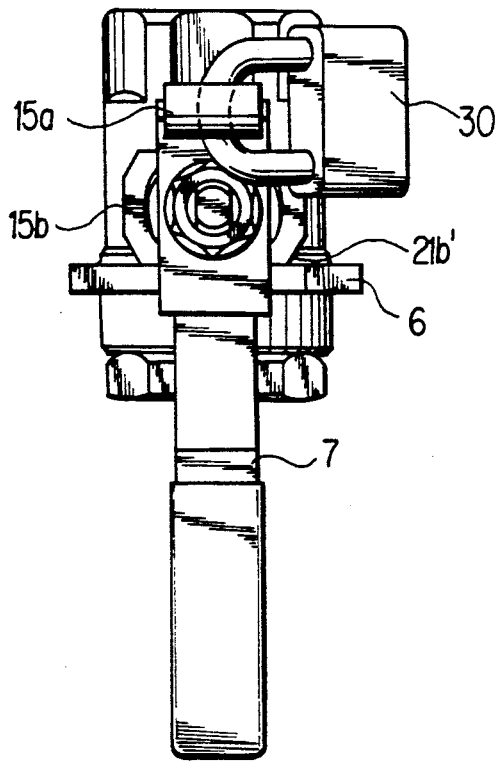
FIG. 7A is a top view of a locked rotary handle and valve locking member in a third quadrant of operation of the rotary handle.
Figure 7B:
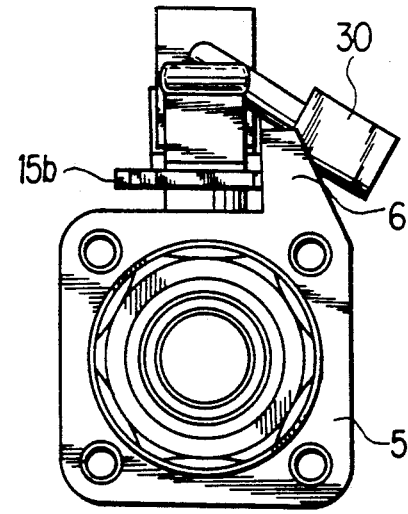
FIG. 7B is a front view of the locked rotary valve and valve locking member of FIG. 7A.
Figure 8A:
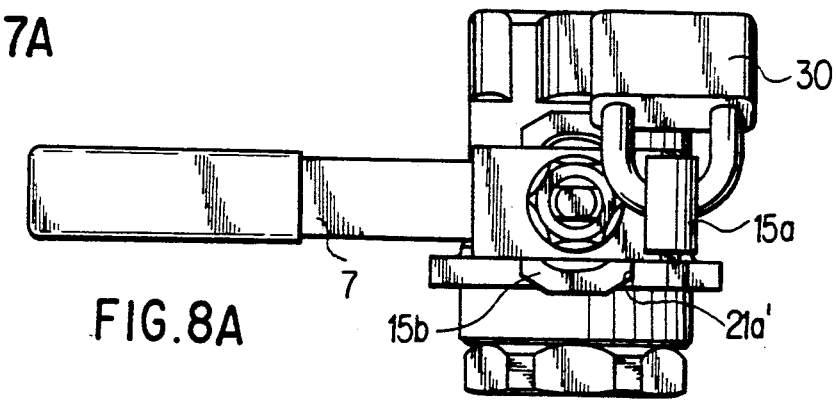
FIG. 8A is a top view of a locked rotary valve and valve locking member showing the rotary handle in a fourth quadrant of operation.
Figure 8B:
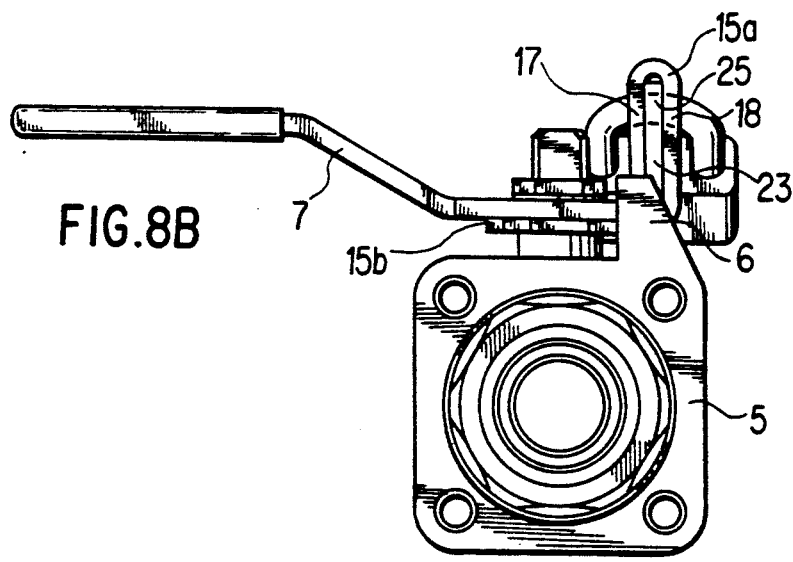
FIG. 8B is a front view of the locked rotary valve and valve locking member of FIG. 8A.

The same procedure is applied in order to rotate and lock the operating handle in the third quadrant illustrated in FIGS. 7A and 7B and the fourth quadrant illustrated in FIGS. 8A and 8B.

From the above explanation, it can be seen that the handle can be easily rotated between the four quadrants without requiring the removal of the locking member. Additionally, the rotary valve can be unlocked, rotary stroked and relocked smoothly with one hand and the device can be mounted in any quadrant. Since the locking member and handle remain on the rotary valve, there are no loose parts. Additionally, since the locking member does not utilize and is not integral with the handle, the handle strength will not be affected.

Obviously, numerous modifications and variations of the present invention are possible in light of the above teachings. For example, an additional member can be snapped onto the locking member which would cover the stem nut 11a and be locked by the padlock. Thus, in addition to preventing the movement of the operating handle, the removal of the handle and locking mechanism from the rotary valve can also be prevented. It is therefore to be understood that within the scope of the appended claims, the invention may be practiced otherwise than as specifically described herein.

What is claimed as new and desired to be secured by Letters Patent of the United States is:

1. A rotary valve comprising:
    a valve body having a first bore therein for fluid flow, said valve body comprising a flange having a stop post;
    a stem extending into a second bore in said valve body;
    control means for controlling fluid flow in said first bore of said valve body, said control means being operatively connected to said stem and being disposed in said first bore;
    a handle mounted on said stem for operating said control means between open and closed positions, said handle comprising an upwardly extending portion having a first hole therein; and a freely slidable valve locking member, said valve locking member defining a substantially L-shape member, one leg of said L-shape member defining a folded portion and comprising second and third holes which are aligned with each other, the other leg of said L-shape member defining an opening;

wherein:

the valve locking member is slidably positioned on said stem such that said stem extends through the opening of the other leg of the valve locking member;

said handle is mounted on said stem above said valve locking member;

said upwardly extending portion of said handle extends between the folded portion of said valve locking member; and said valve locking member is slidable about the valve stem along a distance defined by said opening between at least one locked position and at least one unlocked position;

said at least one locked position occurring when an abutting surface of a periphery of said other leg of the valve locking member abuts against said stop post and the first hole on the handle is aligned with the second and third holes on the folded portion of the valve locking member for permitting a lock means to pass between said first, second and third holes so as to lock said handle and said locking member in a predetermined position; and said at least one unlocked position occurring when said first hole is not aligned with said second and third holes and the abutting surface of said other leg of the valve locking member is spaced away from said stop post thereby permitting movement of said handle.

2. The rotary valve according to claim 1, further comprising:

a stem nut positioned on said stem for securing said valve locking member and said handle on said stem.

3. The rotary valve according to claim 1, wherein said lock means is a padlock.

4. The rotary valve according to claim 1, wherein said handle can be mounted on said stem and locked in any one of four locked positions, wherein each of said locked positions defines a quadrant.

5. A valve locking device for locking a rotary valve, wherein said rotary valve comprises a rotary body and a handle for controlling fluid flow, said valve locking device comprising:

a substantially L-shape member having a first leg defining a folded portion and a second leg having a peripheral surface and defining an opening for a stem of said rotary valve to extend therebetween, said folded portion comprising first and second aligned holes;

wherein said valve locking device and said handle are mounted on said stem of said rotary valve such that an upwardly extending portion of said handle extends into said folded portion of said valve locking device and;

said valve locking device is slidable about the valve stem along a distance defined by said opening between a locked position in which a portion of said peripheral surface of said valve locking device abuts against said stop post and a hole on said upwardly extending portion of said handle is aligned with said first and second aligned holes of said folded portion for permitting a lock means to pass therebetween to prevent movement of said handle, and an unlocked position in which said portion of said peripheral surface of said valve locking device is spaced away from said stop post and the first and second aligned holes are not aligned with said hole on said extending portion of said handle to permit movement of said handle.

6. The valve locking device according to claim 5, further comprising:

stem nut means for securing said valve locking device and said handle on said stem.

7. The valve locking device according to claim 5, wherein said lock means is a padlock.

* * * * *